United States Patent
Kawae et al.

(10) Patent No.: US 12,228,135 B2
(45) Date of Patent: Feb. 18, 2025

(54) REFRIGERATION CYCLE APPARATUS

(71) Applicant: DAIKIN INDUSTRIES, LTD., Osaka (JP)

(72) Inventors: Arisa Kawae, Osaka (JP); Hideki Matsuura, Osaka (JP); Masaru Tanaka, Osaka (JP); Haruka Terai, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 18/811,163

(22) Filed: Aug. 21, 2024

(65) Prior Publication Data

US 2024/0410368 A1    Dec. 12, 2024

Related U.S. Application Data

(63) Continuation of application No. PCT/JP2023/005964, filed on Feb. 20, 2023.

(30) Foreign Application Priority Data

Feb. 22, 2022   (JP) .................... 2022-025587

(51) Int. Cl.
*F04C 29/02*     (2006.01)
*C10M 171/00*    (2006.01)
(Continued)

(52) U.S. Cl.
CPC ......... *F04C 29/02* (2013.01); *C10M 171/008* (2013.01); *F16C 33/109* (2013.01);
(Continued)

(58) Field of Classification Search
CPC ............ C10M 171/008; F04C 2210/14; F04C 2210/145; F04C 2210/266
See application file for complete search history.

(56) References Cited

U.S. PATENT DOCUMENTS 6,044,660 A * 4/2000 Numoto ............... F25B 43/003
                                                62/468
6,082,132 A * 7/2000 Numoto ............... F04B 35/045
                                                62/112
(Continued)

FOREIGN PATENT DOCUMENTS

JP      11-302675 A      11/1999
JP     2005-264931 A      9/2005
(Continued)

OTHER PUBLICATIONS

International Search Report, issued in PCT/JP2023/005964, PCT/ISA/210, dated May 9, 2023.
(Continued)

*Primary Examiner* — Christopher R Zerphey
(74) *Attorney, Agent, or Firm* — Birch, Stewart, Kolasch & Birch, LLP

(57) ABSTRACT

Hydrocarbon-type refrigerants tend to dissolve in refrigerating machine oils, which may result in a decrease in the viscosity of the refrigerating machine oils and cause excessive wear of the sliding portions inside the compressors. An air conditioning apparatus includes a refrigerant circuit in which a compressor, an outdoor heat exchanger, an expansion valve, and an indoor heat exchanger are sequentially connected and a refrigerant is circulated. The compressor includes a sliding portion including a first bearing metal or an Oldham ring. At least one of two members slidable with each other in the sliding portion is formed of aluminum or aluminum alloy. The refrigerant circulating through the refrigerant circuit is a hydrocarbon-type refrigerant. A refrigerating machine oil used in the compressor has a refrigerant solubility of 30% or less at a pressure of 1.9 MPa and at a temperature of 60° C.

11 Claims, 4 Drawing Sheets

(51) Int. Cl.
    *F16C 33/10*     (2006.01)
    *F16C 33/12*     (2006.01)
    *F25B 9/00*     (2006.01)
    *F25B 31/02*     (2006.01)
    *C10N 40/30*     (2006.01)

(52) U.S. Cl.
    CPC ............ *F16C 33/121* (2013.01); *F25B 9/002* (2013.01); *F25B 31/026* (2013.01); *C10N 2040/30* (2013.01); *F04C 2210/14* (2013.01); *F04C 2210/145* (2013.01); *F04C 2210/266* (2013.01); *F04C 2240/50* (2013.01); *F16C 2204/20* (2013.01); *F16C 2362/52* (2013.01)

(56) References Cited

U.S. PATENT DOCUMENTS

| | | | |
|---|---|---|---|
| 6,197,211 | B1 | 3/2001 | Nakajima et al. |
| 8,137,577 | B2 * | 3/2012 | Kaneko ............ C10M 171/008 62/468 |
| 2009/0277212 | A1 | 11/2009 | Kaneko et al. |
| 2010/0176333 | A1 | 7/2010 | Tokiai et al. |
| 2012/0024007 | A1 | 2/2012 | Ota et al. |
| 2019/0233759 | A1 | 8/2019 | Kaneko et al. |
| 2019/0383289 | A1 | 12/2019 | Fullenkamp et al. |
| 2023/0242800 | A1 * | 8/2023 | Usui ................ C10M 171/008 252/68 |

FOREIGN PATENT DOCUMENTS

| | | |
|---|---|---|
| JP | 4012441 B2 | 11/2007 |
| JP | 2008-308610 A | 12/2008 |
| JP | 2009-222033 A | 10/2009 |
| JP | 2012-31239 A | 2/2012 |
| JP | 4885534 B2 | 2/2012 |
| JP | 5290533 B2 | 9/2013 |
| JP | 2018-53199 A | 4/2018 |

OTHER PUBLICATIONS

Written Opinion of the International Searching Authority, issued in PCT/JP2023/005964, PCT/ISA/237, dated May 9, 2023.
International Preliminary Report on Patentability and Written Opinion of the International Searching Authority for International Application No. PCT/JP2023/005964, dated Aug. 27, 2024.

* cited by examiner

REFRIGERATION CYCLE APPARATUS

CROSS REFERENCE TO RELATED APPLICATIONS

This application is a Continuation of PCT International Application No. PCT/JP2023/005964, filed on Feb. 20, 2023, which claims priority under 35 U.S.C. § 119(a) to Patent Application No. JP 2022-025587, filed in Japan on Feb. 22, 2022, all of which are hereby expressly incorporated by reference into the present application.

TECHNICAL FIELD

The present disclosure relates to a refrigeration cycle apparatus.

BACKGROUND ART

Hitherto, compressors that compress hydrocarbon-type refrigerants such as propane have been used. For example, Patent Literature 1 (U.S. Patent Application Publication No. 2019/0383289) discloses a compressor that uses propane as a refrigerant and includes an Oldham ring coated with resin in order to suppress wear.

SUMMARY

A refrigeration cycle apparatus according to a first embodiment includes a refrigerant circuit in which a compressor, a heat radiator, an expansion mechanism, and a heat absorber are sequentially connected and a refrigerant is circulated. The compressor includes a sliding portion including a bearing or an Oldham ring. At least one of two members slidable with each other in the sliding portion is formed of aluminum or aluminum alloy. The refrigerant circulating through the refrigerant circuit is a hydrocarbon-type refrigerant. A refrigerating machine oil used in the compressor has a refrigerant solubility of 30 wt % or less at a pressure of 1.9 MPa and at a temperature of 60° C.

DESCRIPTION OF EMBODIMENTS

(1) Overall Configuration

Figure 1:
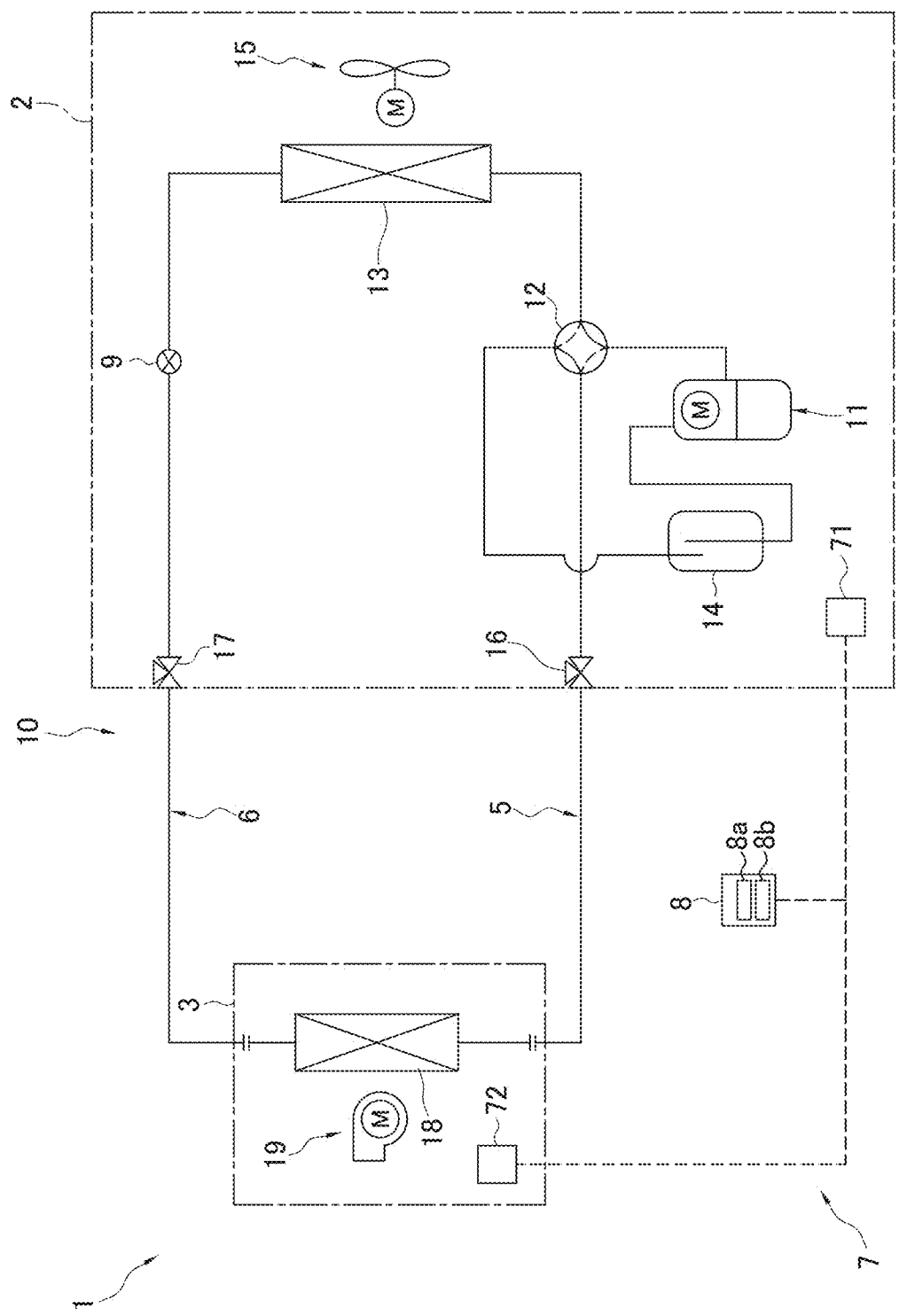
FIG. 1 is a schematic configuration view of an air conditioning apparatus 1.

An air conditioning apparatus 1 is a refrigeration cycle apparatus that performs a vapor compression refrigeration cycle, to thereby condition the air of the target space. As illustrated in FIG. 1, the air conditioning apparatus 1 mainly includes an outdoor unit 2, an indoor unit 3, a gas-refrigerant connection pipe 5, a liquid-refrigerant connection pipe 6, a controller 7, and a remote control 8. The gas-refrigerant connection pipe 5 and the liquid-refrigerant connection pipe 6 connect together the outdoor unit 2 and the indoor unit 3.

The air conditioning apparatus 1 repeatedly performs a refrigeration cycle of compressing a refrigerant sealed within a refrigerant circuit 10 to condense the refrigerant (heat radiation), decompressing the refrigerant to evaporate the refrigerant (heat absorption), and subsequently compressing the refrigerant again.

The refrigerant circuit 10 is filled with a refrigerant for performing the vapor compression refrigeration cycle. The refrigerant filling the refrigerant circuit 10 is a hydrocarbon-type refrigerant. The hydrocarbon-type refrigerant is a refrigerant containing a hydrocarbon compound as the main component. The hydrocarbon compound serving as the main component of the refrigerant preferably has 1 to 8 carbon atoms, more preferably 1 to 5 carbon atoms. Examples of the hydrocarbon compound serving as the main component of the refrigerant include methane, ethane, propane, n-butane, isobutane, n-pentane, isopentane, ethylene, and propylene. Hydrocarbon-type refrigerants tend to have a lower ozone depletion potential (ODP: Ozone Depletion Potential) and a lower global warming potential (GWP: Global Warming Potential) than chlorine-containing refrigerants such as HCFC-type refrigerants and fluorine-containing refrigerants such as HFC-type refrigerants.

The hydrocarbon-type refrigerant used in the refrigerant circuit 10 may be a refrigerant composed of a hydrocarbon compound alone or may be a mixture of a hydrocarbon compound and a refrigerant other than hydrocarbon compounds. Examples of the refrigerant other than hydrocarbon compounds include fluorine-containing refrigerants such as R-134a and carbon dioxide. When the hydrocarbon-type refrigerant contains a refrigerant other than hydrocarbon compounds, the hydrocarbon compound content is 50 wt % or more, 60 wt % or more, 70 wt % or more, 80 wt % or more, or 90 wt % or more. For the hydrocarbon-type refrigerant, a single hydrocarbon compound may be contained alone or two or more hydrocarbon compounds may be contained.

In the refrigerant circuit 10, the refrigerant and a refrigerating machine oil are sealed. The refrigerating machine oil is used mainly in order to lubricate a sliding portion in the compressor 11. In order to circulate the refrigerating machine oil together with the refrigerant through the refrigerant circuit 10, the miscibility between the refrigerating machine oil and the refrigerant is preferably high to some extent. On the other hand, when the miscibility between the refrigerating machine oil and the refrigerant is excessively high, the refrigerant dissolves in the refrigerating machine oil, reducing the viscosity of the refrigerating machine oil and possibly reducing the lubricity of the refrigerating machine oil. For these reasons, an appropriate refrigerating machine oil is preferably selected in accordance with the refrigerant such that the miscibility between the refrigerating machine oil and the refrigerant is within an appropriate range. In the case of using a hydrocarbon-type refrigerant in the refrigerant circuit 10, the refrigerating machine oil preferably contains polyalkylene glycol (PAG) as the main component. Examples of PAG include polyethylene glycol, polypropylene glycol, and a copolymerization compound of polyethylene glycol and polypropylene glycol.

The refrigerating machine oil used in the refrigerant circuit 10 may be a refrigerant composed of PAG alone or may be a mixture of PAG and a lubricant other than PAG. Examples of the lubricant other than PAG include mineral oil and alkylbenzene. When the refrigerating machine oil contains a lubricant other than PAG, the PAG content is 50 wt % or more, 60 wt % or more, 70 wt % or more, 80 wt % or more, or 90 wt % or more. The refrigerating machine oil may contain a single PAG alone or may contain two or more PAGs.

The refrigerating machine oil preferably includes, as an additive, at least one or more selected from the group consisting of an extreme pressure additive, an acid scavenger, and an antioxidant. Such additives are preferably added, for example, in an amount of 5.0 wt % or less, to the refrigerating machine oil.

Examples of the extreme pressure additive include extreme pressure additives including phosphates; organic sulfur compound-type extreme pressure additives such as monosulfides, polysulfides, sulfoxides, sulfones, thiosulfinates, sulfurized fats and oils, thiocarbonates, thiophenes, thiazoles, and methanesulfonates; thiophosphoric acid ester-type extreme pressure additives such as thiophosphoric acid triesters; ester-type extreme pressure additives such as higher fatty acids, hydroxyaryl fatty acids, polyhydric alcohol esters, and acrylates; organochlorine-type extreme pressure additives such as chlorinated hydrocarbons such as chlorinated paraffin and chlorinated carboxylic derivatives; organic fluorinated-type extreme pressure additives such as fluorinated aliphatic carboxylic acids, fluorinated ethylene resins, fluorinated alkylpolysiloxanes, and fluorinated graphite; alcohol-type extreme pressure additives such as higher alcohols; and metallic compound-type extreme pressure additives such as naphthenates (such as lead naphthenate), fatty acid salts (such as fatty acid lead salts), thiophosphates (such as lead dialkyl dithiophosphate), thiocarbamates, organic molybdenum compounds, organotin compounds, organogermanium compounds, and borate esters.

Examples of the acid scavenger include epoxy compounds such as phenyl glycidyl ether, alkyl glycidyl ethers, alkylene glycol glycidyl ethers, cyclohexene oxide, α-olefin oxides, and epoxidized soybean oil, and carbodiimide. Of these, from the viewpoint of miscibility with the refrigerating machine oil, preferred are phenyl glycidyl ether, alkyl glycidyl ethers, alkylene glycol glycidyl ethers, cyclohexene oxide, and α-olefin oxides. The number of carbon atoms of such an acid scavenger is preferably 3 or more and 30 or less, more preferably 4 or more and 24 or less. The number of carbon atoms of such an α-olefin oxide is preferably 4 or more and 50 or less, more preferably 4 or more and 24 or less. Such acid scavengers may be used alone or in combination of two or more thereof.

Examples of the antioxidant include phenol-type antioxidants and amine-type antioxidants. Examples of the phenol-type antioxidants include 2,6-di-tert-butyl-4-methylphenol (DBPC), 2,6-di-tert-butyl-4-ethylphenol, 2,2'-methylenebis(4-methyl-6-tert-butylphenol), 2,4-dimethyl-6-tert-butylphenol, 2,6-di-tert-butylphenol, di-tert-butyl-p-cresol, and bisphenol A. Examples of the amine-type antioxidants include N,N'-diisopropyl-p-phenylenediamine, N,N'-di-sec-butyl-p-phenylenediamine, phenyl-α-naphthylamine, N,N'-di-phenyl-p-phenylenediamine, and N,N-di(2-naphthyl)-p-phenylenediamine.

(1-1) Outdoor Unit 2

The outdoor unit 2 is connected, via the gas-refrigerant connection pipe 5 and the liquid-refrigerant connection pipe 6, to the indoor unit 3 to constitute a part of the refrigerant circuit 10. The outdoor unit 2 mainly has a compressor 11, a four-way switching valve 12, an outdoor heat exchanger 13, an expansion valve 9, a low-pressure receiver 14, an outdoor fan 15, a gas-side shutoff valve 16, and a liquid-side shutoff valve 17.

The compressor 11 is a device that compresses the low-pressure refrigerant in the refrigeration cycle to a high pressure. The compressor 11 in which compression elements of the rotary type, the scroll type, or the like are rotationally driven by a compressor motor to change the volume of the compression chamber, compresses the refrigerant in the compression chamber. The compressor motor can be controlled in terms of operation frequency by an inverter.

The four-way switching valve 12 switches the connection states of the refrigerant circuit 10, to thereby switch between the first connection state (solid lines in FIG. 1) and the second connection state (dotted lines in FIG. 1). The first connection state is connection of the discharge side of the compressor 11 to the outdoor heat exchanger 13 and connection of the suction side of the compressor 11 to the gas-side shutoff valve 16. The second connection state is connection of the discharge side of the compressor 11 to the gas-side shutoff valve 16 and connection of the suction side of the compressor 11 to the outdoor heat exchanger 13. The four-way switching valve 12 has four connection ports.

The outdoor heat exchanger 13 functions, during the cooling operation, as a condenser or a heat radiator for the high-pressure refrigerant in the refrigeration cycle, and functions, during the heating operation, as an evaporator or a heat absorber for the low-pressure refrigerant in the refrigeration cycle. The outdoor heat exchanger 13 has a plurality of heat transfer tubes (not shown) through which the refrigerant flows and a plurality of heat transfer fins (not shown) among which air flows. The plurality of heat transfer tubes are arranged side-by-side in the up-down directions and the heat transfer tubes each extend substantially in the horizontal direction. Examples of the material of the heat transfer tubes include copper, copper alloys (such as brass), and stainless steel (such as SUS304). The plurality of heat transfer fins extending in the up-down directions are arranged side-by-side, at the predetermined intervals, in the direction in which the heat transfer tubes extend. The plurality of heat transfer fins and the plurality of heat transfer tubes are combined together such that the plurality of heat transfer tubes extend through each of the heat transfer fins.

The outdoor fan 15 supplies the outdoor air to the outdoor heat exchanger 13 to generate an air flow that exchanges heat with the refrigerant in the outdoor heat exchanger 13 and subsequently discharges the heat to the outside of the outdoor unit 2. The outdoor fan 15 is rotationally driven by an outdoor fan motor.

The expansion valve 9 is disposed between the liquid-side end of the outdoor heat exchanger 13 and the liquid-side shutoff valve 17. The expansion valve 9 is, for example, an electronic expansion valve in which the valve opening degree can be controlled by electronic control.

The low-pressure receiver 14 is disposed between the suction side of the compressor 11 and one of the four connection ports of the four-way switching valve 12. The low-pressure receiver 14 is a refrigerant container in which an excess refrigerant in the refrigerant circuit 10 can be stored as a liquid refrigerant.

The gas-side shutoff valve 16 is a manual valve disposed, within the outdoor unit 2, at the connection part to the gas-refrigerant connection pipe 5.

The liquid-side shutoff valve 17 is a manual valve disposed, within the outdoor unit 2, at the connection part to the liquid-refrigerant connection pipe 6.

The outdoor unit 2 has an outdoor-unit control unit 71 that controls operations of parts constituting the outdoor unit 2. The outdoor-unit control unit 71 has a microcomputer including a CPU, a memory, and the like. The outdoor-unit control unit 71 is connected, via a communication line, to an indoor-unit control unit 72 of each indoor unit 3 and sends or receives control signals and the like.

(1-2) Indoor Unit 3

The indoor unit 3 is disposed, in the indoor space serving as the target space, on the wall surface, the ceiling, or the like. The indoor unit 3 is connected, via the gas-refrigerant connection pipe 5 and the liquid-refrigerant connection pipe 6, to the outdoor unit 2 and constitutes a part of the refrigerant circuit 10. The indoor unit 3 mainly has an indoor heat exchanger 18 and an indoor fan 19.

The liquid-side end of the indoor heat exchanger 18 is connected to the liquid-refrigerant connection pipe 6. The gas-side end of the indoor heat exchanger 18 is connected to the gas-refrigerant connection pipe 5. The indoor heat exchanger 18 functions, during the cooling operation, as an evaporator or a heat absorber for the low-pressure refrigerant in the refrigeration cycle, and functions, during the heating operation, as a condenser or a heat radiator for the high-pressure refrigerant in the refrigeration cycle. The indoor heat exchanger 18 has, as with the outdoor heat exchanger 13, a plurality of heat transfer tubes (not shown) through which the refrigerant flows and a plurality of heat transfer fins (not shown) among which air flows.

The indoor fan 19 suctions the air in the indoor space serving as the target space, to generate an air flow that exchanges heat with the refrigerant in the indoor heat exchanger 18 and subsequently discharges the heat to the outside of the indoor unit 3. The indoor fan 19 is rotationally driven by an indoor fan motor.

The indoor unit 3 has an indoor-unit control unit 72 that controls operations of parts constituting the indoor unit 3. The indoor-unit control unit 72 has a microcomputer including a CPU, a memory, and the like. The indoor-unit control unit 72 is connected, via a communication line, to the outdoor-unit control unit 71 and sends or receives control signals and the like.

(1-3) Controller 7

In the air conditioning apparatus 1, the outdoor-unit control unit 71 and the indoor-unit control unit 72 are connected together via a communication line, to thereby constitute a controller 7 that controls operations of the air conditioning apparatus 1. The controller 7 mainly has a CPU and memories such as a ROM and a RAM. The controller 7 executes various processing and control as a result of collective functioning of parts included in the outdoor-unit control unit 71 and the indoor-unit control unit 72.

The controller 7 controls elements of the refrigerant circuit 10 via the outdoor-unit control unit 71 and the indoor-unit control unit 72. The control targets of the controller 7 are, for example, the expansion valve 9, the compressor 11, the four-way switching valve 12, the outdoor fan 15, the indoor fan 19, and the remote control 8. The controller 7 controls elements of the refrigerant circuit 10 such that, for example, the temperature of the fluids (the refrigerant and the refrigerating machine oil) flowing through the refrigerant circuit 10 of the air conditioning apparatus 1 is the predetermined temperature or less. Examples of such control include control of the driving frequency of the compressor 11 to less than the predetermined valve, control of the temperature of the refrigerant discharged from the compressor 11 to less than the predetermined temperature, and control of the pressure of the refrigerant discharged from the compressor 11 to less than the predetermined pressure.

(1-4) Remote Control 8

The remote control 8 is disposed in the indoor space serving as the target space or in the specified space of a building including the target space and is used by a user or the like in order to command the operation control of the air conditioning apparatus 1 and to monitor the operation state.

The remote control 8 includes a receiving part 8a such as operation buttons and a touch panel and a display 8b that can display various information items. The receiving part 8a is operated by a user or the like to thereby receive input of various information items. The remote control 8 is connected, via communication lines, to the outdoor-unit control unit 71 and the indoor-unit control unit 72 and supplies information items received at the receiving part 8a from a user or the like, to the controller 7. The remote control 8 outputs the information items received from the controller 7, on the display 8b.

The information items that the receiving part 8a receives from the user or the like are not limited and examples include information items about the command of executing the cooling operation mode, the command of executing the heating operation mode, the command of stopping the operation, specification of setting the temperature, and the like. The information items displayed on the display 8b are not limited and examples include the current operating mode (the cooling or the heating operation mode), the set temperature, and information items indicating occurrence of various faults.

(2) Detailed Configuration of Compressor 11

Figure 2:
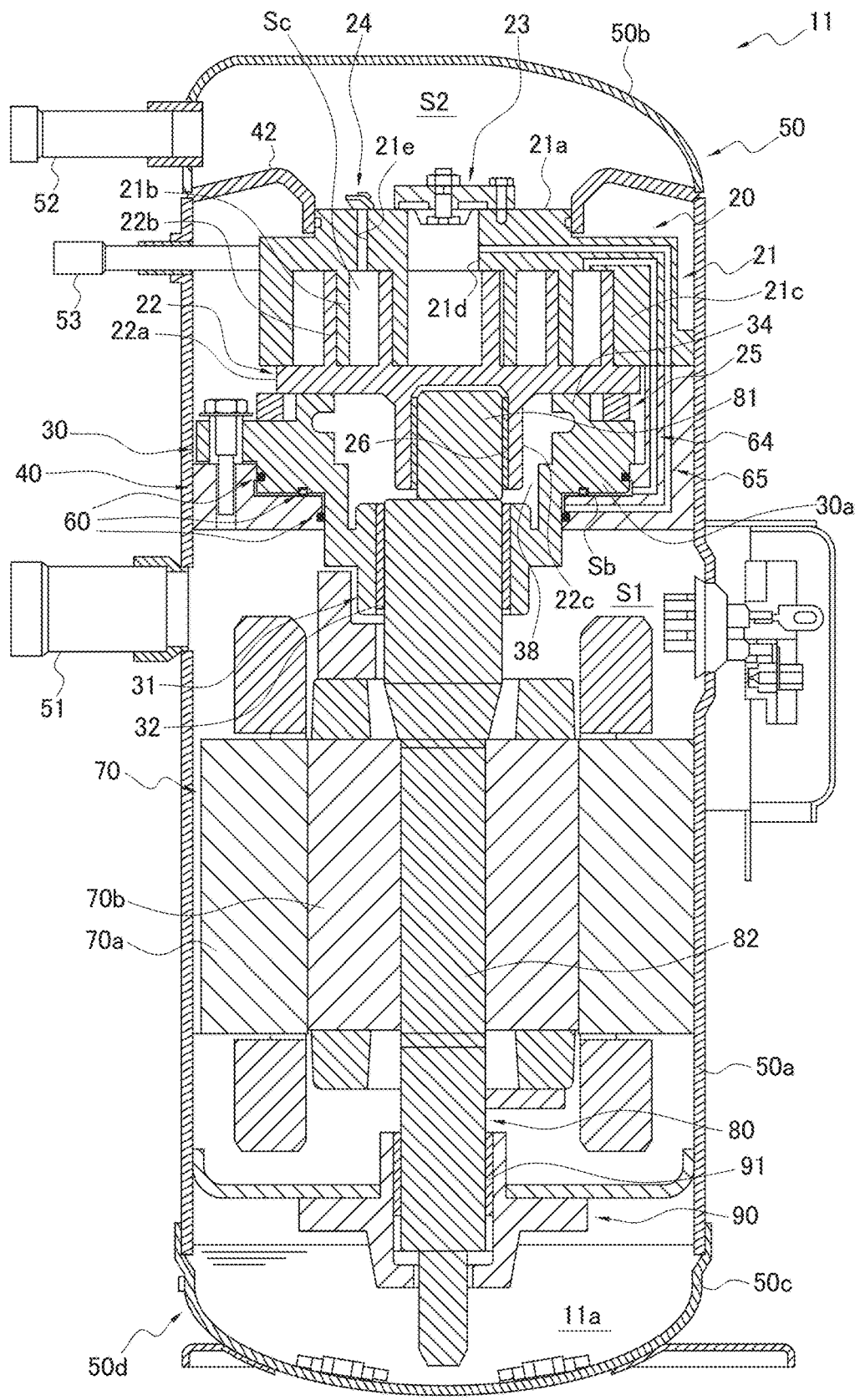
FIG. 2 is a schematic sectional view of a compressor 11.

The compressor 11 is, what is called, a low-pressure dome-type scroll compressor. As illustrated in FIG. 2, the compressor 11 mainly has a casing 50, a compression mechanism 20, a floating member 30, a housing 40, a sealing member 60, a motor 70, a crankshaft 80, and a lower bearing housing 90.

(2-1) Casing 50

The casing 50 has a cylindrical member 50a having a substantially cylindrical shape, an upper lid 50b attached to the upper end of the cylindrical member 50a, and a lower lid 50c attached to the lower end of the cylindrical member 50a. The cylindrical member 50a, the upper lid 50b, and the lower lid 50c are fixed together by welding so as to keep a hermetic seal. The casing 50 houses constituent parts of the compressor 11 including the compression mechanism 20, the floating member 30, the housing 40, the sealing member 60, the motor 70, the crankshaft 80, and the lower bearing housing 90.

In an upper portion of the casing 50, the compression mechanism 20 is disposed. Under the compression mechanism 20, the floating member 30 and the housing 40 are disposed. Under the housing 40, the motor 70 is disposed. Under the motor 70, the lower bearing housing 90 is disposed.

In the bottom portion of the casing 50, an oil reservoir space 11a is formed. In the oil reservoir space 11a, a refrigerating machine oil that lubricates the compression mechanism 20 and the like is stored. The casing 50 has an oil reservoir part 50d forming the oil reservoir space 11a. The oil reservoir part 50d is a part of the casing 50 and corresponds to a part below the lower bearing housing 90. For example, as illustrated in FIG. 2, the oil reservoir part 50d is constituted by the lower lid 50c and the lower end portion of the cylindrical member 50a.

The internal space of the casing 50 is divided by a diaphragm 42 into a first space S1 and a second space S2. The first space S1 is a space below the diaphragm 42. The second space S2 is a space above the diaphragm 42. The diaphragm 42 is fixed, by welding, to the compression mechanism 20 and the casing 50 so as to keep a hermetic seal between the first space S1 and the second space S2.

The diaphragm 42 is a plate-shaped member formed so as to have a ring shape in plan view. The entire circumference of the internal circumference side of the diaphragm 42 is fixed to an upper portion of a fixed scroll 21 of the compression mechanism 20. The entire circumference of the external circumference side of the diaphragm 42 is fixed to the internal surface of the casing 50.

The first space S1 is a space in which the motor 70 is disposed. The first space S1 is a space into which, from the refrigerant circuit 10 having the compressor 11, the refrigerant to be compressed by the compressor 11 flows. The first space S1 is a space into which the low-pressure refrigerant in the refrigeration cycle flows.

The second space S2 is a space into which the refrigerant discharged from the compression mechanism 20 (the refrigerant having been compressed by the compression mechanism 20) flows. The second space S2 is a space into which the high-pressure refrigerant in the refrigeration cycle flows.

The casing 50 is equipped with a suction pipe 51, a discharge pipe 52, and an injection pipe 53 such that the inside and the outside of the casing 50 are in communication with each other.

The suction pipe 51 is attached to a portion near the center in the up-down directions (the vertical direction) of the casing 50. Specifically, as illustrated in FIG. 2, the suction pipe 51 is attached, at a level between the housing 40 and the motor 70, to the cylindrical member 50a so as to extend in the horizontal direction. The suction pipe 51 provides communication between the outside of the casing 50 and the first space S1 in the inside of the casing 50. The refrigerant to be compressed (the low-pressure refrigerant in the refrigeration cycle) passes through the suction pipe 51 and flows into the first space S1.

The discharge pipe 52 is attached to an upper portion of the casing 50 at a level above the diaphragm 42. Specifically, as illustrated in FIG. 2, the suction pipe 51 is attached to the upper lid 50b so as to extend in the horizontal direction. The discharge pipe 52 provides communication between the outside of the casing 50 and the second space S2 in the inside of the casing 50. The refrigerant having been compressed by the compression mechanism 20 and having flowed into the second space S2 (the high-pressure refrigerant in the refrigeration cycle) passes through the discharge pipe 52 and flows to the outside of the compressor 11.

The injection pipe 53 is attached to an upper portion of the casing 50 at a level below the diaphragm 42. Specifically, as illustrated in FIG. 2, the injection pipe 53 is attached to the cylindrical member 50a, at the level of the compression mechanism 20, so as to extend in the horizontal direction. The end of the injection pipe 53 in the inside of the casing 50 is, as illustrated in FIG. 2, connected to the fixed scroll 21 of the compression mechanism 20. The injection pipe 53 is in communication with, via a path (not shown) formed in the fixed scroll 21, a compression chamber Sc being compressed and disposed in the inside of the compression mechanism 20. An intermediate-pressure refrigerant (the refrigerant having a pressure between the low pressure and the high pressure in the refrigeration cycle) is supplied from the refrigerant circuit 10 having the compressor 11, via the injection pipe 53, to the compression chamber Sc being compressed.

(2-2) Compression Mechanism 20

The compression mechanism 20 mainly has the fixed scroll 21 and a movable scroll 22. The fixed scroll 21 and the movable scroll 22 are combined together to form the compression chamber Sc. The compression mechanism 20 compresses the refrigerant in the compression chamber Sc and discharges the compressed refrigerant.

(2-2-1) Fixed Scroll 21

The fixed scroll 21 is, as illustrated in FIG. 2, disposed on the housing 40. The fixed scroll 21 and the housing 40 are fixed together using fixing means such as bolts.

The fixed scroll 21 has a disc-shaped fixed-side end plate 21a, a spiral fixed-side wrap 21b, and a circumferential part 21c. The fixed-side wrap 21b and the circumferential part 21c extend from the front surface (lower surface) of the fixed-side end plate 21a to the movable scroll 22 side (downward). When the fixed scroll 21 is viewed from below, the fixed-side wrap 21b is formed so as to have a spiral shape (involute shape) from the near-center portion of the fixed-side end plate 21a to the outer circumferential side. The circumferential part 21c has a cylindrical shape. The circumferential part 21c is positioned on the outer circumferential side of the fixed-side end plate 21a so as to surround the fixed-side wrap 21b.

During operation of the compressor 11, the movable scroll 22 orbits with respect to the fixed scroll 21, causing the refrigerant (the low-pressure refrigerant in the refrigeration cycle) having flowed from the first space S1 into the circumferential-side compression chamber Sc to be compressed as it moves to the innermost-side (central-side) compression chamber Sc. In the near-center portion of the fixed-side end plate 21a, a discharge port 21d that discharges the refrigerant having been compressed in the compression chamber Sc is formed so as to extend through the fixed-side end plate 21a in the thickness direction (up-down directions). The discharge port 21d is in communication with the innermost-side compression chamber Sc. Over the fixed-side end plate 21a, a discharge valve 23 that opens or closes the discharge port 21d is attached. When the pressure of the innermost-side compression chamber Sc in communication with the discharge port 21d is higher, by a predetermined value or more, than the pressure of the space (second space S2) above the discharge valve 23, the discharge valve 23 opens, and the refrigerant flows through the discharge port 21d to the second space S2.

On the outer circumferential side of the discharge port 21d in the fixed-side end plate 21a, a relief vent 21e is formed so as to extend through the fixed-side end plate 21a in the thickness direction. The relief vent 21e is in communication with the compression chamber Sc formed on the outer circumferential side with respect to the innermost-side compression chamber Sc in communication with the discharge port 21d. The relief vent 21e is in communication with the compression chamber Sc being compressed in the compression mechanism 20. A plurality of relief vents 21e may be formed in the fixed-side end plate 21a. Over the fixed-side end plate 21a, a relief valve 24 that opens or closes the relief vent 21e is attached. When the pressure of the compression chamber Sc in communication with the relief vent 21e is higher, by a predetermined value or more, than the space (second space S2) above the relief valve 24, the relief valve 24 serving as a safety valve opens, and the refrigerant flows through the relief vent 21e to the second space S2.

(2-2-2) Movable Scroll 22

The movable scroll 22 has a disc-shaped movable-side end plate 22a, a spiral movable-side wrap 22b, and a cylindrical boss part 22c. The movable-side wrap 22b extends from the front surface (upper surface) of the movable-side end plate 22a to the fixed scroll 21 side (upward). The boss part 22c extends from the back surface (lower surface) of the movable-side end plate 22a to the motor 70 side (downward). When the movable scroll 22 is viewed from above, the movable-side wrap 22b is formed so as to have a spiral shape (involute shape) from the near-center portion of the movable-side end plate 22a to the outer circumferential side.

The fixed-side wrap 21b of the fixed scroll 21 and the movable-side wrap 22b of the movable scroll 22 are combined together to form the compression chamber Sc. The fixed scroll 21 and the movable scroll 22 are combined such that the front surface (lower surface) of the fixed-side end plate 21a faces the front surface (upper surface) of the movable-side end plate 22a. This forms the compression chamber Sc surrounded by the fixed-side end plate 21a, the fixed-side wrap 21b, the movable-side wrap 22b, and the movable-side end plate 22a.

The compression mechanism 20 has a symmetrical wrap structure or an asymmetrical wrap structure. In the case of the compression mechanism 20 having the symmetrical wrap structure, the first compression chamber surrounded by the outer circumferential surface of the movable-side wrap 22b and the inner circumferential surface of the fixed-side wrap 21b and the second compression chamber surrounded by the inner circumferential surface of the movable-side wrap 22b and the outer circumferential surface of the fixed-side wrap 21b are formed so as to have point symmetry when viewed in the vertical direction. In the case of the compression mechanism 20 having the asymmetrical wrap structure, the first compression chamber and the second compression chamber are formed so as not to have point symmetry when viewed in the vertical direction.

The movable-side end plate 22a is disposed above the floating member 30. During operation of the compressor 11, the floating member 30 is pressed, by the pressure of a back-pressure space Sb formed below the floating member 30, toward the movable scroll 22. This brings a pressing part 34, which is an upper part of the floating member 30, into contact with the back surface (lower surface) of the movable-side end plate 22a, causing the floating member 30 to press the movable scroll 22 toward the fixed scroll 21. The force that the floating member 30 presses the movable scroll 22 toward the fixed scroll 21 brings firmly the movable scroll 22 into contact with the fixed scroll 21. This suppresses leakage of the refrigerant from the gap between the tooth tip (tip surface) of the fixed-side wrap 21b and the bottom surface (main surface in contact with the tooth tip) of the movable-side end plate 22a, and the gap between the tooth tip of the movable-side wrap 22b and the bottom surface of the fixed-side end plate 21a.

Figure 3:
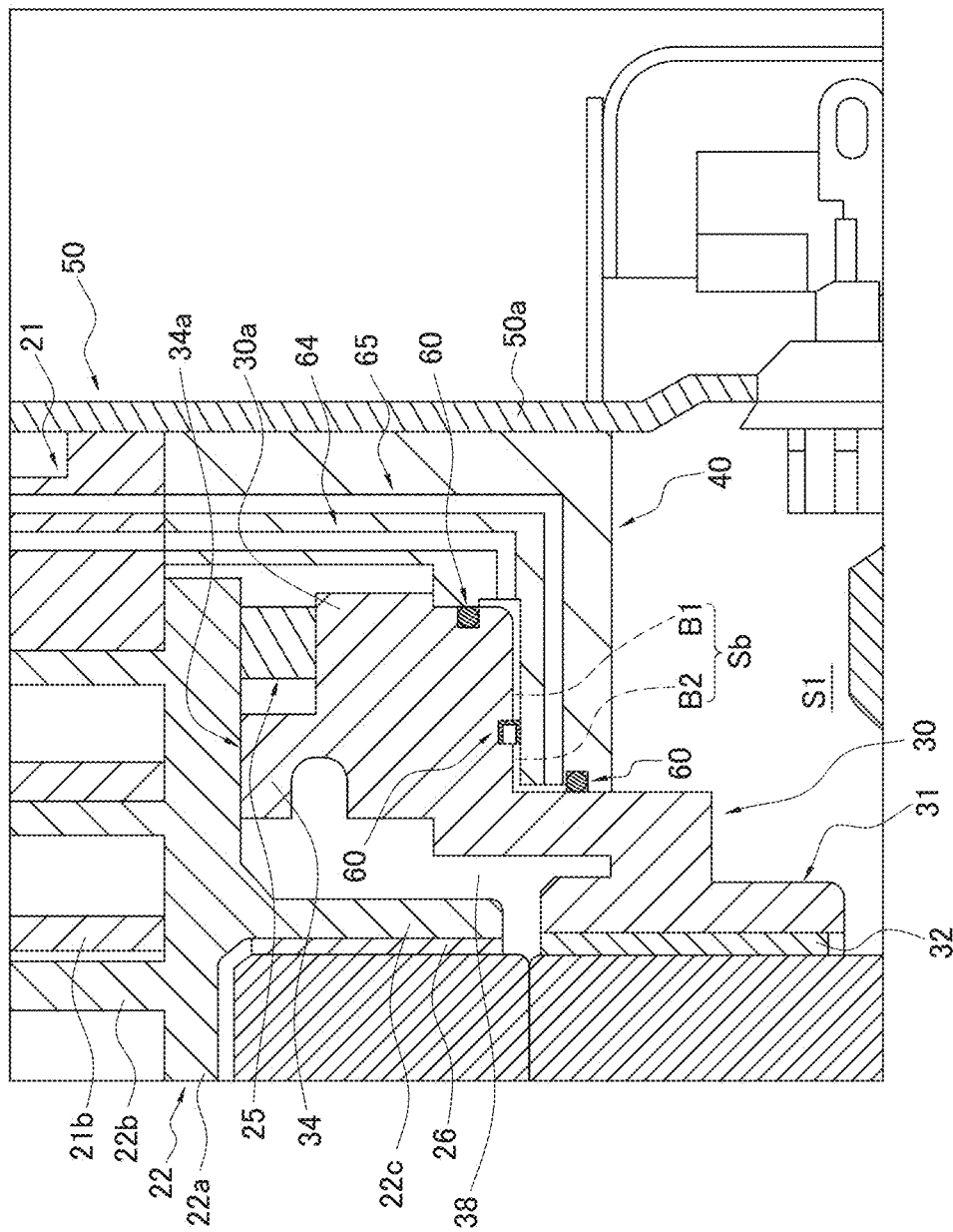
FIG. 3 is an enlarged view of a region including a floating member 30 of the compressor 11.

The back-pressure space Sb is a space formed between the floating member 30 and the housing 40. The back-pressure space Sb is, as illustrated in FIG. 3, mainly formed on the back surface side (under side) of the floating member 30. To the back-pressure space Sb, the refrigerant in the compression chamber Sc of the compression mechanism 20 is guided. Sealing is provided between the back-pressure space Sb and the first space S1 around the back-pressure space Sb. During operation of the compressor 11, the pressure of the back-pressure space Sb is higher than the pressure in the first space S1.

An Oldham ring 25 is disposed between the movable scroll 22 and the floating member 30. The Oldham ring 25 slidably engages with both of the movable scroll 22 and the floating member 30. The Oldham ring 25 suppresses rotation of the movable scroll 22 and causes the movable scroll 22 to orbit with respect to the fixed scroll 21.

The boss part 22c is disposed in an eccentric part space 38 surrounded by the internal surface of the floating member 30. A first bearing metal 26 is disposed inside the boss part 22c. The first bearing metal 26 is, for example, press fit into the boss part 22c and fixed. An eccentric part 81 of the crankshaft 80 is inserted into the first bearing metal 26. The eccentric part 81 is inserted into the first bearing metal 26, thereby connecting the movable scroll 22 and the crankshaft 80.

(2-3) Floating Member 30

The floating member 30 is disposed on the back surface side of the movable scroll 22 (the opposite side from the side on which the fixed scroll 21 is disposed). The floating member 30 is pressed by the pressure of the back-pressure space Sb toward the movable scroll 22, to thereby press the movable scroll 22 toward the fixed scroll 21. A portion of the floating member 30 also functions as a bearing that supports the crankshaft 80.

The floating member 30 mainly has a cylindrical main part 30a, a pressing part 34, and an upper bearing housing 31.

The main part 30a forms the eccentric part space 38 surrounded by the internal surface of the main part 30a. In the eccentric part space 38, the boss part 22c of the movable scroll 22 is disposed.

The pressing part 34 is a cylindrical member that extends from the upper end of the main part 30a toward the movable scroll 22. As illustrated in FIG. 3, a thrust surface 34a at the upper end of the pressing part 34 faces the back surface of the movable-side end plate 22a of the movable scroll 22. The thrust surface 34a is formed so as to have a ring shape in plan view. The floating member 30 is pressed by the pressure of the back-pressure space Sb toward the movable scroll 22, to bring the thrust surface 34a into contact with the back surface of the movable-side end plate 22a, causing the floating member 30 to press the movable scroll 22 toward the fixed scroll 21.

The upper bearing housing 31 is a cylindrical member disposed under the main part 30a (under the eccentric part space 38). A second bearing metal 32 is disposed inside the upper bearing housing 31. The second bearing metal 32 is, for example, press fit into the upper bearing housing 31 and fixed. The second bearing metal 32 rotatably supports a main shaft 82 of the crankshaft 80.

(2-4) Housing 40

The housing 40 is a member disposed under the fixed scroll 21 and the floating member 30 and having a substantially cylindrical shape. The housing 40 supports the floating member 30. Between the housing 40 and the floating member 30, the back-pressure space Sb is formed. The housing 40 is, for example, press fit and attached to the internal surface of the casing 50.

(2-5) Sealing Member 60

The sealing member 60 is a member that forms the back-pressure space Sb between the floating member 30 and the housing 40. The sealing member 60 is, for example, a gasket such as an O ring. As illustrated in FIG. 3, the sealing member 60 divides the back-pressure space Sb into a first chamber B1 and a second chamber B2. The first chamber B1 and the second chamber B2 are spaces formed so as to have a substantially circular ring shape in plan view. The second chamber B2 is disposed inside with respect to the first chamber B1. In plan view, the first chamber B1 has an area larger than the area of the second chamber B2.

The first chamber B1 is in communication with, via a first path 64, the compression chamber Sc being compressed. The first path 64 is a path that guides the refrigerant being compressed in the compression mechanism 20 (intermediate-pressure refrigerant) to the first chamber B1. The first path 64 is formed in the fixed scroll 21 and the housing 40.

The second chamber B2 is in communication with, via a second path 65, the discharge port 21d of the fixed scroll 21. The second path 65 is a path that guides the refrigerant discharged from the compression mechanism 20 (high-pressure refrigerant) to the second chamber B2. The second path 65 is formed in the fixed scroll 21 and the housing 40.

During operation of the compressor 11, the second chamber B2 has a pressure higher than the pressure of the first chamber B1. However, in plan view, the first chamber B1 has an area larger than the area of the second chamber B2 and hence the pressing force of the movable scroll 22 due to the pressure of the back-pressure space Sb toward the fixed scroll 21 is less likely to be excessive. The second chamber B2 is disposed inside with respect to the first chamber B1 and hence balance tends to be ensured between the force pressing the movable scroll 22 downward due to the pressure of the compression chamber Sc and the force of pressing the movable scroll 22 upward due to the floating member 30.

(2-6) Motor 70

The motor 70 drives the movable scroll 22. The motor 70 includes a stator 70a and a rotor 70b. The stator 70a is a cyclic member fixed on the internal surface of the casing 50. The rotor 70b is a cylindrical member disposed inside with respect to the stator 70a. A small gap (air gap) is formed between the inner circumferential surface of the stator 70a and the outer circumferential surface of the rotor 70b.

A crankshaft 80 extends through the rotor 70b in its axial direction. The rotor 70b is coupled, via the crankshaft 80, to the movable scroll 22. In the motor 70, the rotor 70b is rotated to thereby drive the movable scroll 22, causing the movable scroll 22 to be orbited with respect to the fixed scroll 21.

(2-7) Crankshaft 80

The crankshaft 80 couples together the rotor 70b of the motor 70 and the movable scroll 22 of the compression mechanism 20. The crankshaft 80 extends in the up-down directions. The crankshaft 80 transmits the driving force of the motor 70 to the movable scroll 22.

The crankshaft 80 mainly has the eccentric part 81 and the main shaft 82.

The eccentric part 81 is disposed over the main shaft 82. The center axis of the eccentric part 81 is eccentric with respect to the center axis of the main shaft 82. The eccentric part 81 is coupled to the first bearing metal 26 disposed inside the boss part 22c of the movable scroll 22.

The main shaft 82 is rotatably supported by the second bearing metal 32 disposed in the upper bearing housing 31 of the floating member 30 and a third bearing metal 91 disposed in the lower bearing housing 90. The main shaft 82 is coupled, between the upper bearing housing 31 and the lower bearing housing 90, to the rotor 70b of the motor 70. The main shaft 82 extends in the up-down directions.

An oil path (not shown) is formed inside the crankshaft 80. The oil path has a main path and branched paths. The main path extends from the lower end to the upper end of the crankshaft 80 in the axial direction of the crankshaft 80. The branched paths extend from the main path in the radial direction of the crankshaft 80. The refrigerating machine oil in the oil reservoir space 11a is drawn up by a pump (not shown) disposed at the lower end of the crankshaft 80, passed through the oil path, and supplied to sliding portions between the crankshaft 80 and each of the first bearing metal 26, the second bearing metal 32, and the third bearing metal 91, sliding portions of the compression mechanism 20, and the like.

(2-8) Lower Bearing Housing 90

The lower bearing housing 90 is fixed on the inner surface of the casing 50. The lower bearing housing 90 is disposed under the motor 70. The third bearing metal 91 is disposed inside the lower bearing housing 90. The third bearing metal 91 is, for example, press fit into the lower bearing housing 90 and fixed. The main shaft 82 of the crankshaft 80 extends through the third bearing metal 91. The third bearing metal 91 rotatably supports the lower portion side of the main shaft 82 of the crankshaft 80.

(3) Operations of Compressor 11

Operations of the compressor 11 in the normal state will be described. The normal state is a state in which the pressure of the refrigerant discharged through the discharge port 21d of the compression mechanism 20 is higher than the pressure of the compression chamber Sc being compressed.

When the motor 70 is driven, the rotor 70b is rotated and the crankshaft 80 coupled to the rotor 70b is also rotated. When the crankshaft 80 is rotated, the Oldham ring 25 causes the movable scroll 22 not to rotate, but to orbit with respect to the fixed scroll 21. The low-pressure refrigerant having flowed from the suction pipe 51 into the first space S1 passes through the refrigerant path (not shown) formed in the housing 40 and is suctioned to the circumferential-side compression chamber Sc of the compression mechanism 20. When the movable scroll 22 orbits, the first space S1 and the compression chamber Sc are no longer in communication with each other, the volume of the compression chamber Sc decreases and the pressure of the compression chamber Sc increases. In the compression chamber Sc being compressed, the intermediate-pressure refrigerant is injected through the injection pipe 53. The pressure of the refrigerant increases as the refrigerant moves from the circumferential-side (outer) compression chamber Sc to the center-side (inner) compression chamber Sc and eventually reaches the high pressure in the refrigeration cycle. The refrigerant having been compressed by the compression mechanism 20 is discharged through the discharge port 21d of the fixed-side end plate 21a to the second space S2. The high-pressure refrigerant of the second space S2 is discharged through the discharge pipe 52.

(4) Details of Refrigerating Machine Oil

The compressor 11 has sliding portions that are lubricated with the refrigerating machine oil. Such a sliding portion is a portion where two members are slidable with each other. The compressor 11 has the following sliding portions.

Sliding portion where the Oldham ring 25 and the movable scroll 22 are slidable with each other.

Sliding portion where the Oldham ring 25 and the floating member 30 are slidable with each other Sliding portion where the first bearing metal 26 and the crankshaft 80 are slidable with each other Sliding portion where the second bearing metal 32 and the crankshaft 80 are slidable with each other Sliding portion where the third bearing metal 91 and the crankshaft 80 are slidable with each other In at least one of these sliding portions in the compressor 11, at least one of two members slidable with each other is formed of aluminum or aluminum alloy. The aluminum alloy contains 12.6 wt % to 18 wt % of silicon, for example.

In such a sliding portion, two members slidable with each other are not coated with a protecting film of resin or the like. In other words, the surfaces of the two members slidable with each other in the sliding portion are surfaces formed of aluminum or aluminum alloy.

The refrigerating machine oil that lubricates the sliding portions in the compressor 11 contains, as the main components, PAGs that are compositions A to C represented by the following chemical formulas.

$R^1\text{—}[CH_2CH_2O]_m\text{—}R^4$  Composition A:

$R^2\text{—}[CH(CH_3)CH_2O]_n\text{—}R^5$  Composition B:

$R^3\text{—}[CH_2CH_2O]_o\text{—}[CH(CH_3)CH_2O]_p\text{—}R^6$  Composition C:

In the formulas, m, n, o, and p are the numbers of the repeating units and are natural numbers.

In the formulas, $R^1$ to $R^3$ are a hydrogen atom, a hydroxy group (—OH), or a hydrocarbon group or alkoxy group having 1 to 8 carbon atoms.

In the formulas, $R^4$ to $R^6$ are a hydrogen atom or a hydrocarbon group or alkoxy group having 1 to 8 carbon atoms.

The composition A is polyethylene glycol. The composition B is polypropylene glycol. The composition C is a copolymerization compound between polyethylene glycol and polypropylene glycol. The compositions A to C have a molecular weight of 10,000 to 100,000, for example.

The refrigerating machine oil used in the compressor 11 has a refrigerant solubility of 30 wt % or less when the refrigerating machine oil has a pressure of 1.9 MPa and the refrigerating machine oil has a temperature of 60° C.

The refrigerant solubility (unit: wt %) is a parameter in terms of the mixture of the refrigerating machine oil and the refrigerant, the mixture being generated as a result of dissolution of the refrigerant in the refrigerating machine oil, and is represented by the following formula.

Refrigerant solubility=Weight of refrigerant in mixture/Weight of mixture

Weight of mixture=Weight of refrigerant+Weight of refrigerating machine oil

The oil concentration (unit: wt %) is a parameter in terms of the mixture of the refrigerating machine oil and the refrigerant and is represented by the following formula.

Oil concentration=Weight of refrigerating machine oil in mixture/Weight of mixture=1−refrigerant solubility When the refrigerating machine oil has a refrigerant solubility of 30 wt % or less, the oil concentration is 70 wt % or more.

The refrigerating machine oil used in the compressor 11 preferably has a refrigerant solubility of 5 wt % or more when the refrigerating machine oil has a pressure of 1.9 MPa and the refrigerating machine oil has a temperature of 60° C. In other words, the oil concentration is preferably 95 wt % or less under the same conditions.

When the refrigerating machine oil contains PAGs that are the compositions A to C as the main components, the compositions A to C preferably have a hydroxy group ratio relative to all end groups, namely, a hydroxy group content of 40 mol % or more and 90 mol % or less.

When the refrigerating machine oil is the composition A, the end groups are $R^1$ and $R^4$ included in the chemical formula of the composition A. In this case, the hydroxy group content is the ratio of the number of $R^1$ and $R^4$ constituting hydroxy groups to the total number of $R^1$ and $R^4$. When the $R^1$ is a hydroxy group or when the $R^4$ is a hydrogen atom, the end group is a hydroxy group. For example, when the refrigerating machine oil is composed of the composition A alone and $R^1$ is a hydrocarbon group and $R^4$ is a hydrogen atom in all the composition A molecules, the end group including $R^4$ is a hydroxy group and the hydroxy group content is 50 mol %.

When the refrigerating machine oil is the composition B, the end groups are, in the chemical formula of the composition B, $R^2$, $R^5$, and the methyl group included in the repeating unit $[CH(CH_3)CH_2O]_n$. In this case, the hydroxy group content is the ratio of the number of $R^2$ and $R^5$ constituting hydroxy groups to the total number of $R^2$, $R^5$, and the methyl group. When $R^2$ is a hydroxy group or when $R^5$ is a hydrogen atom, the end group is a hydroxy group. For example, when the refrigerating machine oil is composed of the composition B alone and $R^2$ is a hydrocarbon group and $R^5$ is a hydrogen atom in all the composition B molecules, the end group including $R^5$ is a hydroxy group and the hydroxy group content depends on the number n of the repeating unit.

When the refrigerating machine oil is the composition C, the end groups are, in the chemical formula of the composition C, $R^3$, $R^6$, and the methyl group included in the repeating unit $[CH(CH_3)CH_2O]_p$. In this case, the hydroxy group content is the ratio of the number of $R^3$ and $R^6$ constituting hydroxy groups to the total number of $R^3$, $R^6$, and the methyl group. When $R^3$ is a hydroxy group or when $R^6$ is a hydrogen atom, the end group is a hydroxy group. For example, when the refrigerating machine oil is composed of the composition C alone and $R^3$ is a hydrocarbon group and $R^6$ is a hydrogen atom in all the composition C molecules, the end group including $R^6$ is a hydroxy group and the hydroxy group content depends on the number p of the repeating unit.

(5) Examples

An experiment was performed to measure the relations among the hydroxy group content [mol %] of the refrigerating machine oil, oil concentration [wt %], and the abrasion loss [mg] of a sliding portion in the compressor 11. Three refrigerating machine oils A to C used in the experiment individually contain different PAGs as the main components. The PAGs contained in the refrigerating machine oils A to C are as follows.

$CH_3\text{—}[CH_2CH_2O]_n\text{—}[CH(CH_3)CH_2O]_m\text{—}H$  Refrigerating machine oil A:

$CH_3\text{—}[CH_2CH_2O]_n\text{—}H$  Refrigerating machine oil B:

$CH_3\text{—}[CH_2CH_2O]_n\text{—}[CH(CH_3)CH_2O]_m\text{—}R$  Refrigerating machine oil C:

In the formulas of the refrigerating machine oils A to C, n and m are the numbers of repeating units and natural numbers. In the formula of the refrigerating machine oil C, R is a hydrocarbon group having 1 to 10 carbon atoms.

The PAGs contained in the refrigerating machine oil A and the refrigerating machine oil B have hydroxy groups as end groups and hence the refrigerating machine oil A and the refrigerating machine oil B have high hydroxy group contents. The PAG contained in the refrigerating machine oil C does not have hydroxy groups as the end groups and hence the refrigerating machine oil C has a low hydroxy group content. The hydroxy group contents of the refrigerating machine oil A and the refrigerating machine oil C vary depending on the values of m. In general, the refrigerating machine oil A and the refrigerating machine oil B have hydroxy group contents of more than 30 mol %. In general, the refrigerating machine oil C has a hydroxy group content of 30 mol % or less.

In the experiment, the plurality of refrigerating machine oils having different hydroxy group contents were used to measure the oil concentration and the abrasion loss of a sliding portion in the compressor 11. Thus, in the case of variation, within the predetermined range, in the hydroxy group content of the refrigerating machine oil, the tendencies of variations in the oil concentration and the abrasion loss of a sliding portion in the compressor 11 were examined. The refrigerant used in the experiment is propane.

The oil concentration was measured under conditions in which the refrigerant had a condensation temperature of 55° C. and the refrigerating machine oil had a temperature of 60° C.

The abrasion loss of a sliding portion in the compressor 11 was measured by a closed Falex wear test. The pin and the blocks used in the Falex test are as follows.

Pin: aluminum alloy containing 12.6 wt % to 18 wt % of silicon

Blocks: FC250 cast iron

The Falex test was performed using a Falex test machine in accordance with ASTMD2670 in the following manner.

First, the pin and the blocks were set in the Falex test machine; into the test chamber, 200 ml of the refrigerating machine oil was placed and 200 ml of the refrigerant was filled, and the test chamber was sealed. Subsequently, under conditions of a rotational speed of 0.4 m/s, a refrigerating machine oil temperature of 50° C., and a load of 89 N, the pin and the blocks were slid for 10 minutes and the total abrasion loss (mg) of the pin and the blocks was measured. The smaller the abrasion loss, the higher the abrasion resistance of the pin and the blocks.

Figure 4:
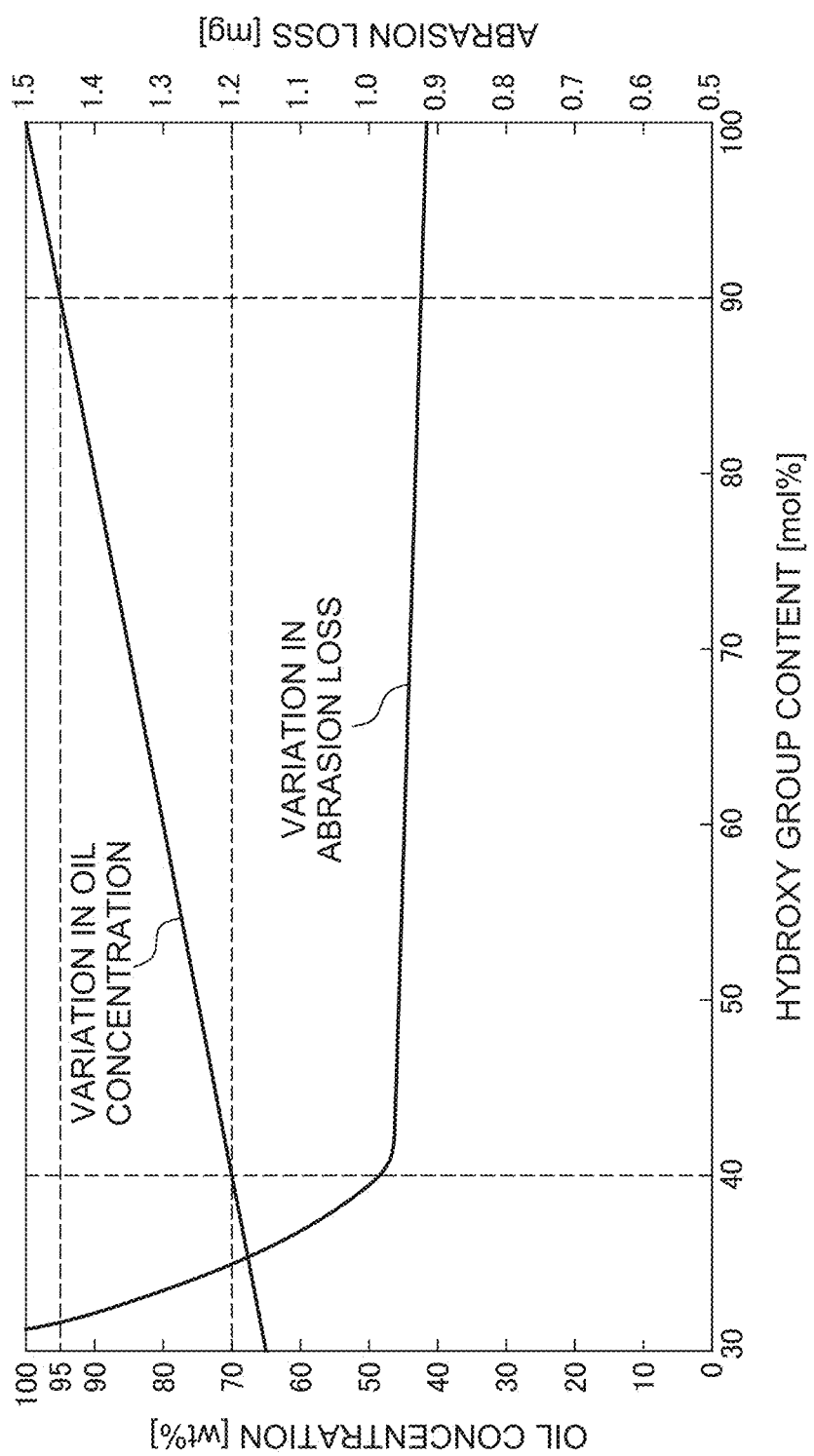
FIG. 4 is a graph of relations among the hydroxy group content of a refrigerating machine oil, oil concentration, and abrasion loss of a sliding portion in a compressor 11.

FIG. 4 is a graph of the experiment results. In FIG. 4, the abscissa axis indicates the hydroxy group content [mol %] of the refrigerating machine oil, the left ordinate axis indicates the oil concentration [wt %], and the right ordinate axis indicates the abrasion loss [mg] of a sliding portion in the compressor 11.

As illustrated in FIG. 4, there is a tendency in which, as the hydroxy group content of the refrigerating machine oil increases, the miscibility between the refrigerating machine oil and the refrigerant decreases and the oil concentration increases. The higher the oil concentration, the less the amount of refrigerant dissolving in the refrigerating machine oil, and therefore the decrease in the viscosity of the refrigerating machine oil is suppressed. Thus, as illustrated in FIG. 4, there is a tendency in which, as the oil concentration increases, the lubricity of the refrigerating machine oil improves and the abrasion loss of a sliding portion in the compressor 11 decreases.

However, when the oil concentration is excessively high, the amount of refrigerant dissolving in the refrigerating machine oil decreases; as a result, the refrigerating machine oil has an excessively high viscosity and the refrigerating machine oil flowing through the refrigerant circuit 10 is less likely to return to the compressor 11. As a result, the amount of refrigerating machine oil inside the compressor 11 becomes insufficient, which may cause a problem such as seizure of a sliding portion in the compressor 11. For this reason, the oil concentration is preferably within the range from the predetermined lower limit value where the abrasion loss of a sliding portion in the compressor 11 is sufficiently small to the predetermined upper limit value where a sufficient amount of refrigerating machine oil is returned to the compressor 11.

As illustrated in FIG. 4, the abrasion loss is high in the range where the hydroxy group content of the refrigerating machine oil is 40 mol % or less; as the hydroxy group content of the refrigerating machine oil increases to 40 mol %, the abrasion loss sharply decreases. When the hydroxy group content of the refrigerating machine oil further increases beyond 40 mol %, the abrasion loss tends to decrease, but substantially does not change. Thus, as a condition for sufficiently reducing the abrasion loss, the refrigerating machine oil preferably has a hydroxy group content of 40 mol % or more. When the refrigerating machine oil has a hydroxy group content of 40 mol % or more, the oil concentration is 70 wt % or more.

In addition, it has been demonstrated that, when the oil concentration is more than 95 wt %, the phenomenon in which the refrigerating machine oil is less likely to return to the compressor 11 tends to occur. For this reason, the oil concentration is preferably 95 wt % or less. When the oil concentration is 95 wt % or less, the hydroxy group content of the refrigerating machine oil is 90 mol % or less.

Thus, the experiment results in FIG. 4 have demonstrated that, in the case of using PAG as the refrigerating machine oil, preferably used is a refrigerating machine oil having an oil concentration of 70 wt % or more, in other words, a refrigerating machine oil having a refrigerant solubility of 30 wt % or less. The hydroxy group content of the refrigerating machine oil is preferably 40 mol % or more and 90 mol % or less. In this case, the oil concentration is 70 wt % or more and 95 wt % or less.

(6) Features

Compared with chlorine-containing refrigerants such as HCFC-type refrigerants and fluorine-containing refrigerants such as HFC-type refrigerants, hydrocarbon-type refrigerants tend to have low lubricity and dissolve in refrigerating machine oils. Thus, in the case of using a hydrocarbon-type refrigerant as the refrigerant of the refrigeration cycle apparatus, the refrigerant itself has low lubricity and dissolution of the refrigerant tends to decrease the viscosity of the refrigerating machine oil, and therefore the abrasion loss of the sliding portion tends to increase. In particular, when a member slidable in the sliding portion is formed of aluminum, abnormal wear tends to occur; even in the case of being formed of silicon-containing aluminum alloy having high abrasion resistance, wear tends to occur. In order to improve the abrasion resistance, when the member slidable in the sliding portion is coated with resin or the like, problems may occur such as degeneration of the resin caused by sliding and degradation of slidability.

In the air conditioning apparatus 1, a refrigerating machine oil employed has an oil concentration of the predetermined value or more at the predetermined temperature and at the predetermined pressure, the oil concentration being the concentration of the refrigerating machine oil in the mixture of the refrigerant and the refrigerating machine oil. Specifically, the refrigerating machine oil used in the air conditioning apparatus 1 has a refrigerant solubility of 30 wt % or less at a pressure of 1.9 MPa and at a temperature of 60° C. In other words, in the air conditioning apparatus 1, the oil concentration is maintained to be 70 wt % or more. This suppresses, during operation of the air conditioning apparatus 1, the decrease in the oil concentration of the mixture of the refrigerant and the refrigerating machine oil circulating through the refrigerant circuit 10, and the resultant decrease in the viscosity of the refrigerating machine oil. This results in suppression of the increase in the abrasion loss in a sliding portion in the compressor 11 due to the excessive decrease in the viscosity of the refrigerating machine oil.

When the refrigerating machine oil contains a PAG, a PAG that has a hydroxy group ratio relative to all end groups of the PAG, namely, a hydroxy group content of 40 mol % or more and 90 mol % or less is employed. As illustrated in FIG. 4, when the PAG has a hydroxy group content of less than 40 mol %, the amount of refrigerant dissolving in the refrigerating machine oil increases. This results in an increase in the probability of occurrence of abnormal wear of a sliding portion in the compressor 11. On the other hand, when the PAG has a hydroxy group content of more than 90 mol %, the refrigerant substantially does not dissolve in the refrigerating machine oil and the refrigerating machine oil discharged from the compressor 11 is less likely to return to the compressor 11. This results in an increase in the probability of occurrence of, for example, seizure of a sliding portion in the compressor 11.

Thus, in the air conditioning apparatus 1, the upper limit value of the refrigerant solubility of the refrigerating machine oil is appropriately set to thereby reduce the abrasion loss of a sliding portion in the compressor 11. In the air conditioning apparatus 1, the lower limit value and the upper limit value of the hydroxy group content of PAG contained in the refrigerating machine oil are appropriately set, to thereby reduce the abrasion loss of a sliding portion in the compressor 11 and suppress the occurrence of the phenomenon in which the refrigerating machine oil is less likely to return to the compressor. In the air conditioning apparatus 1, even when the members slidable with each other in a sliding portion in the compressor 11 are not coated with resin or the like, occurrence of abnormal wear in the sliding portion in the compressor 11 is suppressed.

(7) Modifications (7-1) Modification A

In the air conditioning apparatus 1 of the embodiment, when the refrigerating machine oil contains PAG, the hydroxy group content of the PAG is set to 40 mol % or more and 90 mol % or less. However, the lower limit value of the hydroxy group content may be set to a value more than 40 mol %. For example, the hydroxy group content of the PAG may be more than 50 mol % and 90 mol % or less. In FIG. 4, when the PAG has a hydroxy group content of more than 50 mol %, the abrasion loss of the sliding portion in the compressor 11 is less than 0.95 mg.

As illustrated in FIG. 4, in the range where the PAG has a hydroxy group content of 50 mol % to 90 mol %, the abrasion loss of the sliding portion in the compressor 11 is substantially constant. Thus, the PAG may have a hydroxy group content of 60 mol % or more and 90 mol % or less. Alternatively, the PAG may have a hydroxy group content of 70 mol % or more and 90 mol % or less. Alternatively, the PAG may have a hydroxy group content of 80 mol % or more and 90 mol % or less.

(7-2) Modification B

In the air conditioning apparatus 1 of the embodiment, at least one of two members slidable with each other in the sliding portion in the compressor 11 is aluminum or aluminum alloy. However, the material of the members constituting the sliding portion is not limited. For example, one of the two members slidable with each other in the sliding portion may be formed of aluminum or aluminum alloy while the other one may be formed of iron or aluminum. In this case, the two members slidable with each other in the sliding portion are not coated with a protecting film of resin or the like.

Embodiments of the present disclosure have been described so far; however, it would be understood that the forms and details can be changed in various ways without departing from the spirit and scope of the present disclosure described in Claims.

REFERENCE SIGNS LIST 1 air conditioning apparatus (refrigeration cycle apparatus)
9 expansion valve (expansion mechanism)
10 refrigerant circuit
11 compressor
13 outdoor heat exchanger (heat radiator)
18 indoor heat exchanger (heat absorber)
25 Oldham ring
26 first bearing metal (bearing)
32 second bearing metal (bearing)
91 third bearing metal (bearing)

CITATION LIST

Patent Literature

PTL 1: U.S. Patent Application Publication No. 2019/0383289

The invention claimed is:

1. A refrigeration cycle apparatus comprising a refrigerant circuit in which a compressor, a heat radiator, an expansion mechanism, and a heat absorber are sequentially connected and a refrigerant is circulated,
    wherein the compressor includes a sliding portion including a bearing or an Oldham ring,
    at least one of two members slidable with each other in the sliding portion is formed of aluminum or aluminum alloy,
    the refrigerant is a hydrocarbon-type refrigerant, and
    a refrigerating machine oil used in the compressor has a refrigerant solubility of 30 wt % or less at a pressure of 1.9 MPa and at a temperature of 60° C.,
    the refrigerating machine oil is a polyalkylene glycol having a hydroxy group ratio relative to all end groups of 40 mol % or more and 90 mol % or less,
    the refrigerant is propane.

2. The refrigeration cycle apparatus according to claim 1, wherein the refrigerating machine oil used in the compressor has a refrigerant solubility of 5 wt % or more and 30 wt % or less at a pressure of 1.9 MPa and at a temperature of 60° C.

3. The refrigeration cycle apparatus according to claim 1, wherein the refrigerating machine oil is a polyalkylene glycol having a hydroxy group ratio relative to all end groups of more than 50 mol % and 90 mol % or less.

4. The refrigeration cycle apparatus according to claim 1, wherein the aluminum alloy contains 12.6 wt % to 18 wt % of silicon.

5. The refrigeration cycle apparatus according to claim 1, wherein one of the two members is formed of aluminum or aluminum alloy and another one is formed of aluminum.

6. The refrigeration cycle apparatus according to claim 2, wherein the refrigerating machine oil is a polyalkylene glycol having a hydroxy group ratio relative to all end groups of more than 50 mol % and 90 mol % or less.

7. The refrigeration cycle apparatus according to claim 2, wherein the aluminum alloy contains 12.6 wt % to 18 wt % of silicon.

8. The refrigeration cycle apparatus according to claim 3, wherein the aluminum alloy contains 12.6 wt % to 18 wt % of silicon.

9. The refrigeration cycle apparatus according to claim 2, wherein one of the two members is formed of aluminum or aluminum alloy and another one is formed of aluminum.

10. The refrigeration cycle apparatus according to claim 3, wherein one of the two members is formed of aluminum or aluminum alloy and another one is formed of aluminum.

11. The refrigeration cycle apparatus according to claim 4, wherein one of the two members is formed of aluminum or aluminum alloy and another one is formed of aluminum.

* * * * *